(12) United States Patent
Petrozziello et al.

(10) Patent No.: US 11,466,196 B2
(45) Date of Patent: Oct. 11, 2022

(54) IRON SULFIDE INHIBITOR SUITABLE FOR SQUEEZE APPLICATION

(71) Applicants: Saudi Arabian Oil Company, Dhahran (SA); Clariant International Ltd, Muttenz (CH)

(72) Inventors: Lena Petrozziello, Langenselbold (DE); Christoph Wolfgang Kayser, Mainz (DE); Cyril Okocha, Spring, TX (US); Tao Chen, Dhahran (SA); Qiwei Wang, Dhahran (SA); Norah Aljeaban, Al Khobar (SA)

(73) Assignees: Saudi Arabian Oil Company, Dhahran (SA); Clariant International Ltd, Muttenz (CH)

( * ) Notice: Subject to any disclaimer, the term of this patent is extended or adjusted under 35 U.S.C. 154(b) by 57 days.

(21) Appl. No.: 16/804,876

(22) Filed: Feb. 28, 2020

(65) Prior Publication Data

US 2021/0269701 A1 Sep. 2, 2021

(51) Int. Cl.
 *C09K 8/528* (2006.01)
 *E21B 43/12* (2006.01)
 *C08F 220/56* (2006.01)

(52) U.S. Cl.
 CPC ............ *C09K 8/528* (2013.01); *C08F 220/56* (2013.01)

(58) Field of Classification Search
 CPC .................................. C09K 8/528; E21B 43/12
 (Continued)

(56) References Cited

U.S. PATENT DOCUMENTS

| 6,981,553 B2 | 1/2006 | Stegemeier et al. |
| 7,932,214 B2 * | 4/2011 | Zamora ................. C09K 8/703 |
| | | 507/202 |

(Continued)

FOREIGN PATENT DOCUMENTS

| CN | 2599237 Y | 1/2004 |
| EP | 2650314 A1 | 10/2013 |

(Continued)

OTHER PUBLICATIONS

Farooqui, Nazia M., and Ken S. Sorbie. "The Use of PPCA in Scale-Inhibitor Precipitation Squeezes: Solubility, Inhibition Efficiency, and Molecular-Weight Effects." SPE Production & Operations 31.03 (2016): 258-269.

(Continued)

*Primary Examiner* — Zakiya W Bates
*Assistant Examiner* — Ashish K Varma
(74) *Attorney, Agent, or Firm* — Leason Ellis LLP

(57) ABSTRACT

A polymeric scale inhibitor composition and a method for inhibiting metal sulfide scale formation in a well are provided. The composition includes 80-82 mol % of a first monomeric unit, where the first monomeric unit is 2-acrylamido-2-methylpropane sulfonic acid (AMPS). The composition also includes 2-18 mol % of a second monomeric unit selected from N-vinyl formamide, N-vinyl pyrrolidone, and diallyl dimethyl ammonium chloride. The composition further includes 2-18 mol % of a third monomeric unit selected from acrylic acid, methacrylic acid, esters of acrylic acid or methacrylic acid with an alcohol having 1 to 4 carbon atoms, and carboxyethyl acrylate. The polymeric scale inhibitors show superior adsorption characteristics on rocks and their subsequent release behavior allows for scale inhibition over extended time periods respectively at a signifi- (Continued)

Figure 1A:
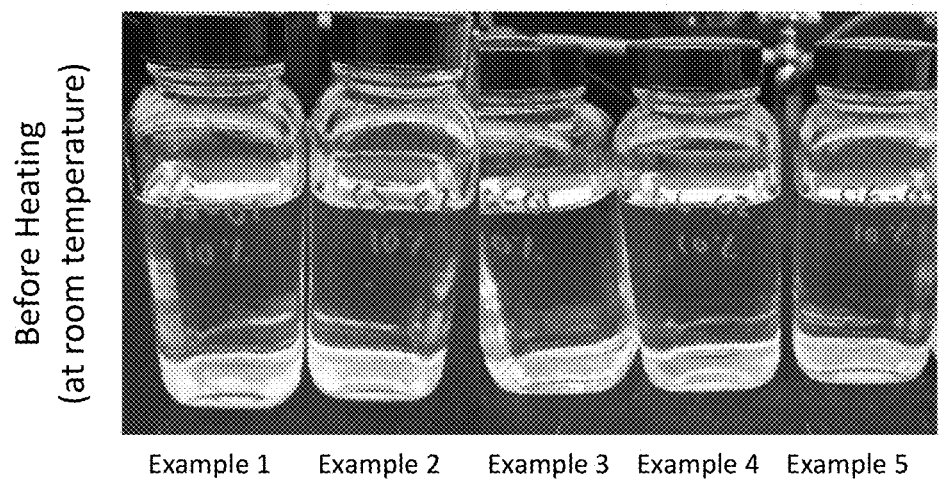

cant volume of coreflood fluids. They are especially suited for downhole application via field scale squeeze treatments.

16 Claims, 6 Drawing Sheets

(58) Field of Classification Search
USPC .......................................................... 166/279
See application file for complete search history.

(56) References Cited

U.S. PATENT DOCUMENTS

| | | | |
|---|---|---|---|
| 2016/0200963 A1* | 7/2016 | Reed | C09K 8/588 |
| | | | 166/305.1 |
| 2017/0029305 A1* | 2/2017 | Gill | C08F 220/06 |
| 2018/0105732 A1 | 4/2018 | Okocha | |
| 2018/0327294 A1 | 11/2018 | Mantri | |
| 2019/0016837 A1* | 1/2019 | Chudomel | C08K 3/26 |

FOREIGN PATENT DOCUMENTS

| | | |
|---|---|---|
| WO | 2006068171 A1 | 6/2006 |
| WO | 2013152832 A1 | 10/2013 |
| WO | 2016155967 A1 | 10/2016 |

OTHER PUBLICATIONS

Ghorbani, Nasser, et al. "Using Nanoscale Dispersed Particles to Assist in the Retention of Polyphosphinocarboxylic Acid (PPCA) Scale Inhibitor on Rock." SPE International Oilfield Nanotechnology Conference and Exhibition Society of Petroleum Engineers, 2012. 8 pages.

Ghorbani, N., et al. "Adsorption of polyphosphinocarboxylic acid (PPCA) scale inhibitor on carbon nanotubes (CNTs): A prospective method for enhanced oilfield scale prevention " Journal of Petroleum Science and Engineering 150 (2017): 305-311.

Guerra, Luiz Alberto De Oliveira, and Galileu Henke Oliveira. "Designing Downhole Chemical Injection Systems." SPE Annual Technical Conference and Exhibition. Society of Petroleum Engineers, 2014. 11 pages.

International Search Report and Written Opinion in a counterpart PCT Application No. PCT/US2021/020047; dated Jun. 17, 2021.

* cited by examiner

FIG. 4

| Polymer | SI Performance | | | | SI Adsorption (mg SI / g rock) | | | |
|---|---|---|---|---|---|---|---|---|
| | 100 ppm 2 h (%) | 100 ppm 24 h (%) | 150 ppm 2 h (%) | 150 ppm 24 h (%) | 0 h | 1 h | 4 h | 20 h |
| Comparative-1 | 97 | 89 | 98 | 94 | 1.4 | 1.3 | 1.3 | 0.6 |
| Example-6 | 95 | 43 | 96 | 94 | 2.0 | 2.1 | 1.9 | 1.0 |
| Example-7 | 93 | 72 | 94 | 93 | 2.2 | 1.7 | 1.5 | 0.8 |
| Example-8 | 99 | 97 | 98 | 100 | 2.1 | 1.9 | 2.0 | 1.9 |
| Example-9 | 100 | 53 | 100 | 97 | 1.8 | 1.9 | 1.5 | 1.2 |
| Example-10 | 98 | 66 | 97 | 87 | 2.3 | 2.2 | 1.9 | 1.6 |
| Example-11 | 100 | 85 | 99 | 84 | 2.5 | 2.2 | 2.1 | 0.9 |

FIG. 5

| Polymer | Monomer 1 | Content (mol%) | Monomer 2 | Content (mol%) | Monomer 3 | Content (mol%) | Monomer 4 | Content (mol%) | Monomer 5 | Content (mol%) |
|---|---|---|---|---|---|---|---|---|---|---|
| Comparative-1 | AMPS | 66 | AM | 12 | NVP | 8 | NVF | 2 | VPA | 2 |
| Example-6 | AMPS | 80 | DADMAC | 10 | AA | 10 | | | | |
| Example-7 | AMPS | 81 | DADMAC | 10 | CEA | 10 | | | | |
| Example-8 | AMPS | 80 | NVF | 14 | AA | 6 | | | | |
| Example-9 | AMPS | 80 | NVF | 10 | CEA | 10 | | | | |
| Example-10 | AMPS | 80 | NVP | 10 | AA | 10 | | | | |
| Example-11 | AMPS | 80 | NVP | 18 | AA | 2 | | | | |

IRON SULFIDE INHIBITOR SUITABLE FOR SQUEEZE APPLICATION

TECHNICAL FIELD

The present disclosure is generally related to chemical compositions, and more particularly related to iron sulfide inhibitor compositions.

BACKGROUND OF THE DISCLOSURE

In the oil and gas industry, especially in sour gas facilities, metal sulfide deposition (e.g., iron sulfide surface deposition) is a persistent scaling issue. Accumulation of sulfide scale in well tubulars and near wellbore formation locations can result in reduced well deliverability. The build-up of sulfide scale interferes with the operation of pumps, valves and other associated surface equipment. Metal sulfide deposition is mainly due to the interaction of metal ions extracted from the formation and/or from materials of construction, with hydrogen sulfide ($H_2S$) present in sour gas feeds. For example, metal ions from the well, such as iron (Fe), lead (Pb), or Zinc (Zn), react with $H_2S$ in the sour gas to form insoluble metal sulfide deposits. These metal sulfide precipitate and form deposits (scales), for example, in a downhole tubular of the well, which affects well deliverability and can interfere with well surveillance and restrict well intervention.

Preventing or mitigating metal sulfide scale formation in sour gas wells has proven difficult, as existing methods and compositions are largely ineffective or cannot be implemented in certain wells. For example, it can be difficult to prevent metal sulfide deposition in the near wellbore location of wells and in particular of those wells exhibiting produced water with high total dissolved solids (TDS) content and high near wellbore downhole flowing temperature.

In the oil industry, calcium carbonate, calcium sulfate, barium sulfate and/or strontium sulfate mineral scales are routinely prevented from precipitating downhole in the target producer well near-wellbore formation and downstream (up-string) tubing by application of scale inhibitor chemical "Squeeze" treatment. The treatment technique involves injection of a dilute solution of scale inhibitor chemical from surface installation down-well into the target well near-wellbore formation rock where the scale inhibitor maintreatment stage is 'squeezed' (propagated) out radially from the wellbore tubing and out to a predetermined distance. Following a defined shut-in (well isolation) period, the 'squeeze' treated well is returned to production and the deployed scale inhibitor chemical that was retained in the near wellbore formation rock is slow-released into the returning well produced fluids and provides mineral scale control from the near wellbore formation up to the producer well wellhead for a designed squeeze lifetime time period. The scale inhibitor chemical deployed in the downhole treatment is functionally configured to interact with the formation rock surfaces it is exposed to. The treatment shut-in time period is employed to allow optimum soak time for maximum uptake of scale inhibitor via a combination of adsorption and/or precipitation and/or dispersion within the near wellbore formation rock for retention of sufficient quantity of chemical to meet the exact scale control demand of the target producer well for the designed squeeze lifetime time period.

Currently there is no truly effective "squeeze" scale inhibitor for control and management of sulfide mineral scale(s) in affected sour producer wells and in particular in those sour producer wells that are characterized by their high salinity produced water and also their high flowing downhole temperature. The present application addresses these and other challenges related to mitigating and preventing metal sulfide scale formation in oil and gas equipment.

SUMMARY OF THE DISCLOSURE

In a first aspect, a polymeric scale inhibitor composition is provided. The composition includes 80-82 mol % of a first monomeric unit, where the first monomeric unit is 2-acrylamido-2-methylpropane sulfonic acid (AMPS). The composition also includes 2-18 mol % of a second monomeric unit selected from N-vinyl formamide, N-vinyl pyrrolidone, and diallyl dimethyl ammonium chloride. The composition further includes 2-18 mol % of a third monomeric unit selected from acrylic acid, methacrylic acid, esters of acrylic acid or methacrylic acid with an alcohol having 1 to 4 carbon atoms, and carboxyethyl acrylate.

In another aspect the second monomeric unit is N-vinyl formamide and the third monomeric unit is acrylic acid. In another aspect, the second monomeric unit is N-vinyl pyrrolidone and the third monomeric unit is acrylic acid. In another aspect, the second monomeric unit is diallyl dimethyl ammonium chloride and the third monomeric unit is acrylic acid.

In another aspect of the polymeric scale inhibitor composition, the second monomeric unit is N-vinyl formamide and the third monomeric unit is carboxyethyl acrylate. In another aspect, the second monomeric unit is diallyl dimethyl ammonium chloride and the third monomeric unit is carboxyethyl acrylate. In another aspect, the second monomeric unit is N-vinyl pyrrolidone and the third monomeric unit is carboxyethyl acrylate.

In another aspect, the composition has a weight average molecular weight between 300 kDa and 1200 kDa. In another aspect, the composition has a polydispersity index in the range of 3 to 23. In another aspect, the composition is thermally stable at a temperature up to 150° C. In another aspect, the composition inhibits the formation of one or more of iron sulfide deposits, zinc sulfide deposits, and lead sulfide deposits in a well.

In a second aspect, a method for inhibiting metal sulfide scale formation in a well is provided. In the method, a polymeric scale inhibitor composition is applied to a wellbore of the well. The polymeric scale inhibitor composition includes 80-82 mol % of a first monomeric unit, where the first monomeric unit is 2-acrylamido-2-methylpropane sulfonic acid (AMPS); 2-18 mol % of a second monomeric unit selected from N-vinyl formamide, N-vinyl pyrrolidone, and diallyl dimethyl ammonium chloride; and 2-18 mol % of a third monomeric unit selected from acrylic acid, methacrylic acid, esters of acrylic acid or methacrylic acid with an alcohol having 1 to 4 carbon atoms, and carboxyethyl acrylate.

In another aspect of the method, the second monomeric unit is N-vinyl formamide and the third monomeric unit is acrylic acid. In another aspect, the second monomeric unit is N-vinyl pyrrolidone and the third monomeric unit is acrylic acid. In another aspect, the second monomeric unit is diallyl dimethyl ammonium chloride and the third monomeric unit is acrylic acid.

In another aspect of the method, the second monomeric unit is N-vinyl formamide and the third monomeric unit is carboxyethyl acrylate. In another aspect, the second monomeric unit is diallyl dimethyl ammonium chloride and the third monomeric unit is carboxyethyl acrylate.

In yet another aspect of the method, the polymeric scale inhibitor composition is applied via a squeeze treatment from surface installation down-well by squeezing it from within the well tubing out into the near wellbore formation rock, and upon return of the well to production the polymeric scale inhibitor inhibits the formation of one or more of iron sulfide deposits, zinc sulfide deposits, and lead sulfide deposits.

BRIEF DESCRIPTION OF THE DRAWING FIGURES

Figure 1B:
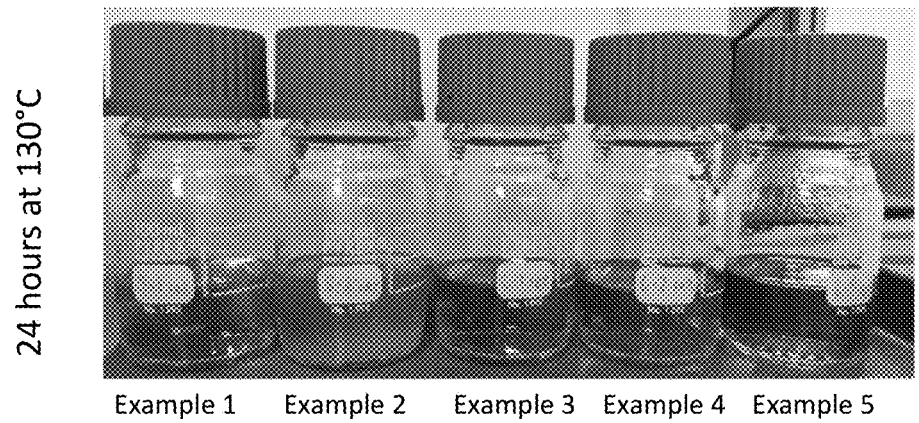
Figure 2:
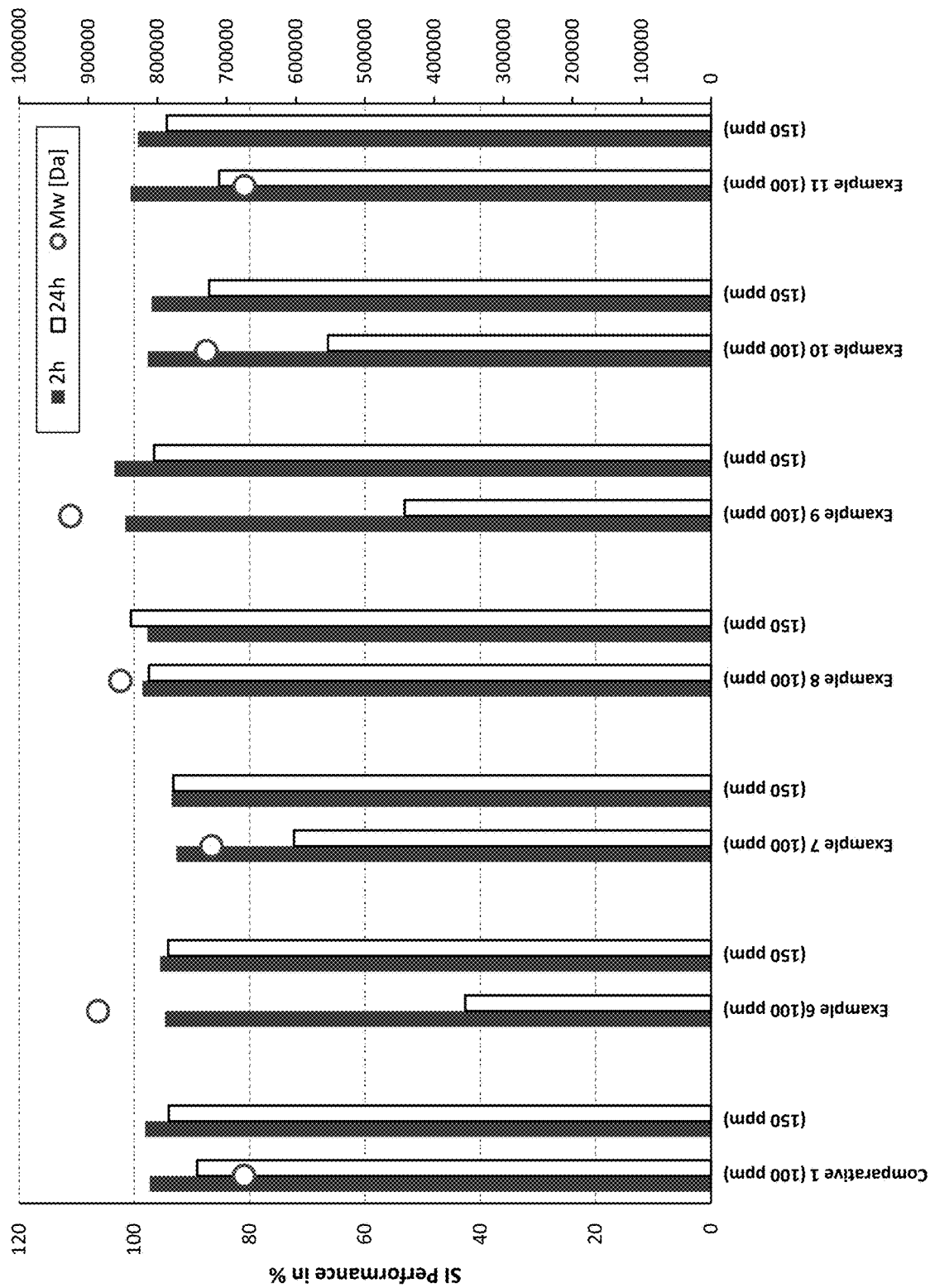
Figure 3:
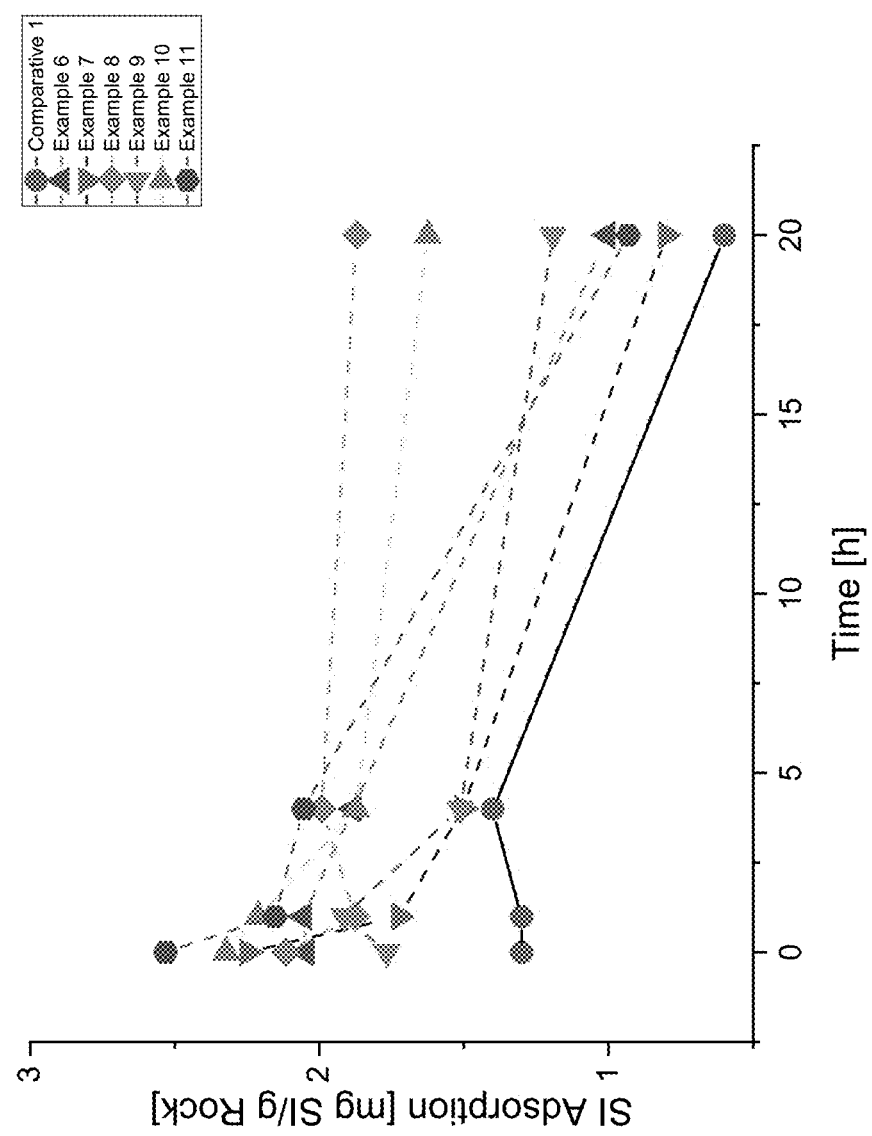
Figure 6:
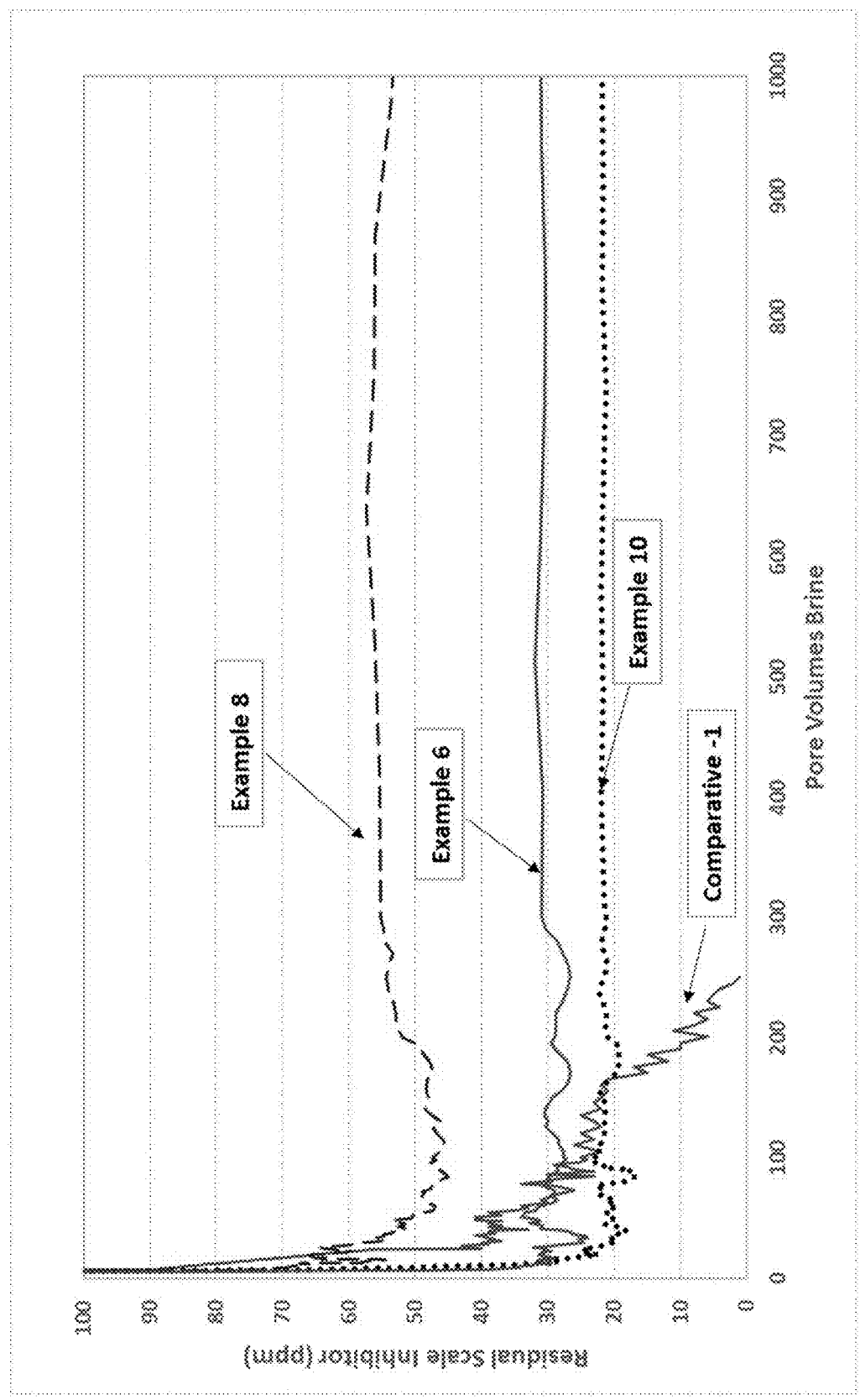

FIGS. 1A-1B display the results of a brine compatibility test for a polymeric scale inhibitor composition of the present application in accordance with one or more embodiments;

FIG. 2 displays the results of a static iron sulfide inhibition test comparing an existing scale inhibitor (Comparative 1) with limited squeeze properties with various polymeric scale inhibitor compositions of the present application in accordance with one or more embodiments;

FIG. 3 displays the results of a static adsorption test comparing existing scale inhibitor (Comparative 1) with polymeric scale inhibitor compositions of the present application in accordance with one or more embodiments;

FIG. 4 shows a table displaying the results of the scale inhibition performance and static adsorption performance of various polymeric scale inhibitors of the present application, which are presented in the static iron sulfide inhibition test of FIG. 2 and the static adsorption test of FIG. 3 in accordance with one or more embodiments;

FIG. 5 shows a table displaying the chemical composition of various polymeric scale inhibitor compositions of the present application, which are presented in the static iron sulfide inhibition test of FIG. 2 and the static adsorption test of FIG. 3 in accordance with one or more embodiments; and FIG. 6 shows desorption characteristics and the polymeric scale inhibitor concentration decay/polymeric scale inhibitor return profile of the polymeric scale inhibitor compositions from a Silurian dolomite core plug under reservoir conditions in accordance with one or more embodiments.

DETAILED DESCRIPTION OF CERTAIN EMBODIMENTS IN ACCORDANCE WITH THE DISCLOSURE

By way of overview and introduction, the present application discloses compositions and methods for inhibiting metal sulfide formation and deposition in a well using a polymeric scale inhibitor composition. In one or more embodiments, the polymeric scale inhibitor composition of the present application comprises 80-82 mol % of a first monomeric unit, where the first monomeric unit is 2-acrylamido-2-methylpropane sulfonic acid (AMPS). The polymeric scale inhibitor composition can further comprise 2-18 mol % of a second monomeric unit and 2-18 mol % of a third monomeric unit. The second monomeric unit can be chosen from N-vinyl formamide, N-vinyl pyrrolidone, and diallyl dimethyl ammonium chloride, while the third monomeric unit can be chosen from acrylic acid, methacrylic acid, esters of acrylic acid or methacrylic acid with an alcohol having 1 to 4 carbon atoms, and carboxyethyl acrylate.

In one or more embodiments of the present methods, a polymeric scale inhibitor composition of the present application can be applied to a wellbore of a well. The application of the polymeric scale inhibitor composition to the wellbore can inhibit or prevent metal sulfide formation in the well. For example, the present compositions and methods can be used to mitigate or prevent iron sulfide surface deposition in the well.

As such, the present compositions and methods can be used to reduce metal sulfide formation in a well and other gas or oil refinery units.

These and other aspects of the present compositions and methods are described in further detail below with reference to the accompany drawing figures, in which one or more illustrated embodiments, arrangements, and features of the polymeric scale inhibitor compositions are shown. The compositions and methods of the present application are not limited in any way to the illustrated embodiments and/or arrangements. It should be understood that the compositions and methods as shown in the accompanying figures are merely exemplary of the compositions and methods of the present application, which can be embodied in various forms as appreciated by one skilled in the art. Therefore, it is to be understood that any structural and functional details disclosed herein are not to be interpreted as limiting the present compositions and methods, but rather are provided as a representative embodiment and/or arrangement for teaching one skilled in the art one or more ways to implement the present compositions and methods.

Further, while the descriptions and examples in the present application often refer to "iron sulfide" depositions in sour gas wells, it should be understood that other metal sulfide deposits can also be formed in sour gas facilities, including lead sulfide and zinc sulfide deposits for example. As such, the present compositions and methods can be used not only to inhibit iron sulfide deposition, but also the deposition of other metal sulfide species.

The polymeric scale inhibitor composition of the present application generally comprises three monomeric units, which together form a terpolymer. In one or more embodiments, the first monomeric unit is 2-methylpropane sulfonic acid (AMPS). The polymeric scale inhibitor composition comprises 80 mol %-82 mol % of AMPS. In at least one embodiment, the polymeric scale inhibitor composition can comprise approximately 80 mol % of AMPS. The first monomeric unit helps to disperse metal sulfide particles in formation brines. Specifically, application of the polymeric scale inhibitor composition in a producer well results in the formation of metal sulfide particles/polymeric scale inhibitor complex ("particle/polymer complex"). Accordingly, the dispersion of the metal sulfide particles in formation brines is based on the anionic and hydrophilic character of AMPS in the composition that stabilizes the formed particle/polymer complex in water.

In one or more embodiments, the second monomeric unit of the polymeric scale inhibitor composition is selected from N-vinyl formamide, N-vinyl pyrrolidone, and diallyl dimethyl ammonium chloride. The polymeric scale inhibitor composition can comprise 2 mol %-18 mol % of the second monomeric unit. The second monomeric unit of the polymeric scale inhibitor composition improves the interaction of the metal sulfide particles with the polymeric scale inhibitor composition, which thereby enhances the composition's ability to disperse the metal sulfide particles in formation water.

Similarly, in one or more embodiments, the third monomeric unit of the polymeric scale inhibitor composition is selected from acrylic acid, methacrylic acid, esters of acrylic acid or methacrylic acid with an alcohol having 1 to 4 carbon atoms, and carboxyethyl acrylate. The polymeric scale inhibitor composition can comprise 2 mol %-18 mol % of the third monomeric unit. The third monomeric unit aids in the adsorption of the polymeric scale inhibitor composition on limestone and dolomite reservoir formation.

In one or more embodiments, the polymeric scale inhibitor composition has a polydispersity index in the range of 3 to 23. In one or more embodiments, the polymeric scale inhibitor composition has a weight average molecular weight between 300 kilodaltons (kDa) and 1200 kDa. Embodiments in which the composition has a weight average molecular weight range of 300-1200 kDa provide substantially improved performance in metal sulfide scale inhibition relative to conventional scale inhibitors, such as an inhibitor shown and described in International Patent Application Publication No. WO 2016/155967 A1. Such embodiments also provide improved compatibility with high calcium-containing synthetic formation brine and improved adsorption to rock.

In at least one embodiment, the polymeric scale inhibitor composition can comprise 80 mol %-82 mol % of AMPS, 2 mol %-18 mol % of N-vinyl formamide, and 2 mol %-18 mol % of acrylic acid. In one or more embodiments, the polymeric scale inhibitor composition can comprise 80 mol %-82 mol % of AMPS, 2 mol %-18 mol % of N-vinyl pyrrolidone, and 2 mol %-18 mol % of acrylic acid. Similarly, in at least one embodiment, the polymeric scale inhibitor composition can comprise 80 mol %-82 mol % of AMPS, 2 mol %-18 mol % of diallyl dimethyl ammonium chloride, and 2 mol %-18 mol % of acrylic acid.

In other embodiments, other combinations of monomeric units can be utilized. For example, in at least one embodiment, the polymeric scale inhibitor composition can comprise 80 mol %-82 mol % of AMPS, 2 mol %-18 mol % of N-vinyl formamide, and 2 mol %-18 mol % of carboxyethyl acrylate. In one or more embodiments, the polymeric scale inhibitor composition can comprise 80 mol %-82 mol % of AMPS, 2 mol %-18 mol % of diallyl dimethyl ammonium chloride, and 2 mol %-18 mol % of carboxyethyl acrylate. Likewise, in at least one embodiment, the polymeric scale inhibitor composition can comprise 80 mol %-82 mol % of AMPS, 2 mol %-18 mol % of N-vinyl pyrrolidone, and 2 mol %-18 mol % of carboxyethyl acrylate.

Preferably the metal sulfide scale inhibitors according to the invention are prepared by free-radical chain growth polymerization. Preferred processes are for example solution polymerization, gel polymerization, suspension polymerization, precipitation polymerization, emulsion polymerization. Suitable initiators as for example organic peroxides and azo compounds are well known those skilled in the art.

In accordance with one or more embodiments, the present application also discloses methods for inhibiting metal sulfide scale formation in a well. The present methods utilize one or more of the polymeric scale inhibitor compositions discussed above. In one or more embodiments, the method can comprise applying the polymeric scale inhibitor composition to a wellbore of the well. In one or more embodiments, the polymeric scale inhibitor composition is applied to the wellbore via a squeeze treatment near the wellbore. Specifically, in one or more embodiments, the composition can be applied as part of a mixed solvent package in a diluted or field fluid-squeeze injection fluid package. The application of the polymeric scale inhibitor composition to the wellbore results in the inhibition of metal sulfide scale formation in the well, which can include one or more of iron sulfide, zinc sulfide, and lead sulfide formations.

In one or more embodiments, the polymeric scale inhibitor compositions of the present application provide improved brine compatibility with high Total Dissolved Salt (TDS) brines and high calcium brines. This characteristic of the present polymeric scale inhibitor compositions is exemplified in example of FIGS. 1A-1B.

FIGS. 1A-1B shows the results of a brine compatibility test that evaluated the brine compatibility of with produced water—specifically high TDS produced water with high levels of calcium ions. Specifically, FIGS. 1A-1B shows the interaction of high TDS/calcium brine with different variants of the polymeric scale inhibitor composition of the present application that displayed good iron sulfide (FeS) inhibition performance. Brine compatibility is important for an inhibitor composition as failed compatibility can cause formation damage due to precipitation under the conditions of the well (e.g., high temperatures).

In this brine compatibility test, brine samples were heated at a temperature of 130° C. for 24 hours at atmospheric pressure. The brine samples were from a high TDS brine comprising over 230,000 mg/L of TDS. Each of the brine samples included a separate variant of the polymeric scale inhibitor composition of the present application. Example 1 includes an inhibitor comprising AMPS, acrylic acid, and N-vinyl pyrrolidone; Example 2 includes an inhibitor comprising AMPS, methacrylic acid, and N-vinyl pyrrolidone; Example 3 includes an inhibitor comprising AMPS, N-vinyl formamide, and acrylic acid; Example 4 includes an inhibitor composition comprising AMPS, N-vinyl formamide, and methacrylic acid; Example 5 includes an inhibitor comprising AMPS, N-vinyl formamide, and carboxyethyl acrylate.

FIG. 1A shows the high TDS brine samples at room temperature before heating, and FIG. 1B shows the high TDS samples after heating at 130° C. for 24 hours. As shown in FIGS. 1A and 1B, the inhibitor compositions of the present application showed varying compatibility in the high TDS brine, with Example 1 and Example 5 exhibiting the best brine compatibilities among the samples.

In one or more embodiments, the polymeric scale inhibitor compositions of the present application adhere to rock surfaces and upon desorption over time they provide effective inhibition against metal sulfide scale formation (e.g., iron sulfide scale formation). In particular, the polymeric scale inhibitor compositions of the present application can adsorb on the rock surfaces and then slow release into produced water to effectively inhibit metal sulfide scale formation (e.g., iron sulfide scale formation) over a longer time span. This mitigation of metal sulfide depositions in and around the wellbore and downhole tubing can minimize tubing blockage over several weeks and up to several months and allow for easier well intervention. These characteristics of the polymeric scale inhibitor compositions of the present application are exemplified in the examples of FIGS. 2, 3, 4 and 5.

FIG. 2 shows the results of a static iron sulfide inhibition test, which demonstrates the iron sulfide scale inhibition performance of polymeric scale inhibitor compositions comprising various monomer combinations of the present application in accordance with one or more embodiments.

In the static iron sulfide inhibition test the scaling ions ($Fe^{2+}$ and $HS^-$) were combined in the presence of a polymeric scale inhibitor comprising AMPS (monomer 1) and another active monomer (monomer 2) for interaction with sulfide scale and another active monomer (monomer 3) for adsorption on rock formation. Two polymer concentrations were tested (100 mg/L and 150 mg/L). Each sample was then heated up to 95° C. for either 2 hours and 24 hours without stirring. Without the addition of the polymeric scale inhibitor (control) the formed iron sulfide sedimented and the concentration of iron in solution was reduced to zero or near zero indicating iron sulfide scale formation. The precipitated iron sulfide scale grows and then settle out of solution as a solid deposit layer on the test jar base. In the presence of the polymeric sulfide scale inhibitor however, the formed iron sulfide nuclei are inhibited to prevent further growth and remain in solution as a suspension of dispersed scale particles. The iron concentration in solution was determined via inductively coupled plasma-optical emission spectrometry (ICP-OES) using the following equation:

$$[SI\ Performance]\ \% = \frac{(Fe^{2+}\ Test) - (Fe^{2+}\ Blank)}{(Fe^{2+}\ Control) - (Fe^{2+}\ Blank)} \times 100$$

For each sample, the concentration of sulfur was 750 ppm (750 mg/L), and the concentration of iron was 100 ppm (100 mg/L) at a solution pH adjusted to pH 5.5. The sulfide scale inhibitor concentration was 100 ppm or 150 ppm (100 or 150 mg/L) for each inhibitor chemical tested. In the graph of FIG. 2, the SI performance for each sample is shown at 2 hours (2 h) and 24 hours, and the weight average molecular weight $M_w$ [Da] in Daltons for each sample is indicated. The table presented in FIG. 5 shows the respective compositions of the various polymeric sulfide scale inhibitors tested and their results displayed in FIG. 4. More specifically, FIG. 4 shows a table displaying the results of the SI Inhibition Performance (FeS) and SI Adsorption Performance for the various polymeric sulfide scale inhibitors tested used as squeezable Scale Inhibitors compared to an existing inhibitor, Comparative-1 (without squeeze performance).

As shown in the graphs of FIG. 2, the displayed polymeric scale inhibitor compositions having varied active monomers (monomer 2 in FIG. 5) exhibited comparable iron sulfide inhibition as compared with a known inhibitor, which is shown and described in International Patent Application Publication No. WO 2016/155967 A1 (denoted in the graphs as Comparative 1.") with an additional introduced functionality for squeeze treatment.

The respective compositions of the various polymeric scale inhibitor compositions are shown in FIG. 5, including the known inhibitor "Comparative 1".

FIG. 3 shows the results of a static adsorption test which evaluates the interaction between the polymeric scale inhibitor compositions in accordance with one or more embodiments of the present application and representative rock material in the presence of high TDS formation water. In other words, the static adsorption test is a performance indicator for the adsorption (retention) behavior on the rock formation for the polymeric scale inhibitor compositions. In this example, the adsorption behavior on limestone of various polymeric scale inhibitor compositions of the present application was determined. For the static adsorption test, each sample comprised 2 g of rock plus 20 mL of a high salinity brine (concentration of calcium in the brine was 19,200 mg/L) with a defined inhibitor composition concentration (500 mg/L in high salinity formation brine). Each sample was shaken to ensure complete coverage of the rock. The rock-to-brine ratio for the samples was 1:10, where the rock was Silurian dolomite (150 mesh).

The samples were placed in a fan assisted oven at a test temperature of 95° C. Measurements of the polymeric scale inhibitor concentration in the respective brine samples were taken at 0, 1, 4, and 20 hours. These measurements were taken at each time point after the sample had been cooled to room temperature. Each sample was filtered (0.45 µm RC filters) and diluted 1:100 in deionized water, and quantification of the polymeric scale inhibitor was performed via ICP-OES (sulfur content; 4 mL injection volume). FIG. 5 displays a table showing the respective compositions of the various polymeric scale inhibitor compositions of the present application in the respective samples of the static adsorption test, as well as the inhibitors present in the comparative samples (i.e., known inhibitor, "Comparative 1.").

As shown in the graph of FIG. 3, the polymeric scale inhibitor compositions of the present application exhibited improved adsorption performance as compared to the conventional sulfide scale inhibitor as provided in International Patent Application Publication No. WO 2016/155967 A1 (conventional inhibitor is denoted in the graph as "Comparative 1"), after 20-hour tests.

The desorption characteristics presented in FIG. 6 show the polymeric scale inhibitor concentration decay/polymeric scale inhibitor return profile of various polymeric scale inhibitor compositions of the present application from a Silurian dolomite core plug under reservoir conditions indicating the retention and the extended release after 1000-2000 pore volumes fluid throughput at significant levels to successfully control sulfide scale formation and deposition. The graph of FIG. 6 also shows the improvement of various polymeric scale inhibitor compositions of the present application (Examples 6, 8, 10) as compared with the conventional sulfide scale inhibitor, Comparative 1.

The polymeric scale inhibitor compositions of the present application provide several other improvements over convention scale inhibitor compositions and methods. For example, the present polymeric scale inhibitor compositions are thermally stable at high temperatures, including temperatures up to approximately 150° C. In at least one embodiment, the present polymeric scale inhibitor compositions are thermally stable at temperatures up to 170° C.

The present polymeric scale inhibitor compositions and methods also reduce and often inhibit iron sulfide deposition from reservoir to topside facilities through near wellbore squeeze treatment. Specifically, the present polymeric scale inhibitor compositions and methods effectively inhibit and mitigate metal sulfide deposition from near the wellbore region to topside facilities. Further, the active functional groups of the present compositions improve the interaction between composition and rock surface, and thus make the compositions suitable for squeeze treatment. For example, a polymeric scale inhibitor of the present application can be applied to the wellbore of a well by squeezing it from within the well tubing out into the near wellbore formation rock. Upon return of the well to production, the polymeric scale inhibitor slowly releases from the rock at a concentration that is sufficient to inhibit the formation and deposition of sulfide scale along the production line.

Although much of the foregoing description has been directed to polymeric scale inhibitor compositions and methods for inhibiting metal sulfide scale formation, the compositions and methods disclosed herein can be similarly deployed and/or implemented in scenarios, situations, and settings far beyond the referenced scenarios. It should be further understood that any such implementation and/or deployment is within the scope of the composition and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A polymeric scale inhibitor composition, comprising:
   80-82 mol % of 2-acrylamido-2-methylpropane sulfonic acid (AMPS) as a primary monomeric unit;
   2-18 mol % of a secondary monomeric unit selected from the group consisting of N-vinyl formamide, N-vinyl pyrrolidone, and diallyl dimethyl ammonium chloride; and
   2-18 mol % of a tertiary monomeric unit selected from the group consisting of acrylic acid, methacrylic acid, esters of acrylic acid or methacrylic acid with an alcohol having 1 to 4 carbon atoms, and carboxyethyl acrylate,
   wherein the composition has a weight average molecular weight between 300 kDa and 1200 kDa and wherein the composition inhibits the formation of one or more of iron sulfide deposits, zinc sulfide deposits, and lead sulfide deposits.

2. The composition of claim 1, wherein the secondary monomeric unit is N-vinyl formamide and the tertiary monomeric unit is acrylic acid.

3. The composition of claim 1, wherein the secondary monomeric unit is N-vinyl pyrrolidone and the tertiary monomeric unit is acrylic acid.

4. The composition of claim 1, wherein the secondary monomeric unit is diallyl dimethyl ammonium chloride and the tertiary monomeric unit is acrylic acid.

5. The composition of claim 1, wherein the secondary monomeric unit is N-vinyl formamide and the tertiary monomeric unit is carboxyethyl acrylate.

6. The composition of claim 1, wherein the secondary monomeric unit is diallyl dimethyl ammonium chloride and the tertiary monomeric unit is carboxyethyl acrylate.

7. The composition of claim 1, wherein the secondary monomeric unit is N-vinyl pyrrolidone and the tertiary monomeric unit is carboxyethyl acrylate.

8. The composition of claim 1, wherein the composition has a polydispersity index in the range of 3 to 23.

9. The composition of claim 1, wherein the composition is thermally stable at a temperature up to 150° C.

10. A method for inhibiting metal sulfide scale formation in a well, the method comprising:
    applying a polymeric scale inhibitor composition to a wellbore of the well, wherein the polymeric scale inhibitor composition comprises:
      80-82 mol % of 2-acrylamido-2-methylpropane sulfonic acid (AMPS) as a primary monomeric unit;
      2-18 mol % of a secondary monomeric unit selected from the group consisting of N-vinyl formamide, N-vinyl pyrrolidone, and diallyl dimethyl ammonium chloride; and
      2-18 mol % of a tertiary monomeric unit selected from the group consisting of acrylic acid, methacrylic acid, esters of acrylic acid or methacrylic acid with an alcohol having 1 to 4 carbon atoms, and carboxyethyl acrylate,
    wherein the polymeric scale inhibitor composition is applied via a squeeze treatment and wherein the polymeric scale inhibitor composition inhibits the formation of one or more iron sulfide deposits, zinc sulfide deposits, and lead sulfide deposits in the well.

11. The method of claim 10, wherein the secondary monomeric unit is N-vinyl formamide and the tertiary monomeric unit is acrylic acid.

12. The method of claim 10, wherein the secondary monomeric unit is N-vinyl pyrrolidone and the tertiary monomeric unit is acrylic acid.

13. The method of claim 10, wherein the secondary monomeric unit is diallyl dimethyl ammonium chloride and the tertiary monomeric unit is acrylic acid.

14. The method of claim 10, wherein the secondary monomeric unit is N-vinyl formamide and the tertiary monomeric unit is carboxyethyl acrylate.

15. The method of claim 10, wherein the secondary monomeric unit is diallyl dimethyl ammonium chloride and the tertiary monomeric unit is carboxyethyl acrylate.

16. The method of claim 10, wherein the method comprises the application of the polymeric scale inhibitor by squeezing it from within the well tubing out into the near wellbore formation rock and wherein upon return of the well to production the polymeric scale inhibitor slowly releases from the rock at a concentration that is sufficient to inhibit the formation and deposition of sulfide scale along the production line.

\* \* \* \* \*